(12) United States Patent
Kim (10) Patent No.: US 11,470,538 B2
(45) Date of Patent: Oct. 11, 2022

(54) METHOD AND SYSTEM FOR NETWORK SLICE INTERWORKING OF 5G NETWORK

(71) Applicant: ELECTRONICS AND TELECOMMUNICATIONS RESEARCH INSTITUTE, Daejeon (KR)

(72) Inventor: Jeong Yun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/383,281

(22) Filed: Jul. 22, 2021

(65) Prior Publication Data
US 2022/0095199 A1 Mar. 24, 2022

(30) Foreign Application Priority Data
Sep. 22, 2020 (KR) .................. 10-2020-0122318

(51) Int. Cl.
*H04W 48/02* (2009.01)
*H04W 60/00* (2009.01)
*H04W 48/18* (2009.01)
*H04W 48/16* (2009.01)

(52) U.S. Cl.
CPC .......... *H04W 48/02* (2013.01); *H04W 48/16* (2013.01); *H04W 48/18* (2013.01); *H04W 60/00* (2013.01)

(58) Field of Classification Search
CPC ..... H04W 48/02; H04W 48/16; H04W 48/18; H04W 60/00; H04W 8/02; H04W 60/04; H04W 88/18
See application file for complete search history.

(56) References Cited

U.S. PATENT DOCUMENTS

| 2017/0289791 A1 | 10/2017 | Yoo et al. |
| 2019/0053148 A1 | 2/2019 | Lee et al. |
| 2019/0387411 A1 | 12/2019 | Choi et al. |

(Continued)

FOREIGN PATENT DOCUMENTS

KR 20190018297 A 2/2019

OTHER PUBLICATIONS

"3rd Generation Partnership Project; Technical Specification Group Services and System Aspects; System Architecture for the 5G System (5GS)"; 3GPP TS 23.501 V16.2.0., Sep. 2019.

*Primary Examiner* — Diane D Mizrahi (57) ABSTRACT

A network slice interworking method includes receiving a network slice information request from a user equipment (UE), identifying network slice subscription information of the UE, verifying whether the network slice subscription information matches pre-stored network slice selection assistance information (NSSAI), transmitting network slice information including the pre-stored NSSAI to the UE when the network slice subscription information matches the pre-stored NSSAI, transmitting a network slice selection request to a network slice selection function (NSSF) when the network slice subscription information does not match the pre-stored NSSAI, receiving a network slice selection result in response to the network slice selection request, and transmitting network slice information including the received network slice selection result to the UE.

13 Claims, 6 Drawing Sheets

(56) References Cited

U.S. PATENT DOCUMENTS

| | | |
|---|---|---|
| 2020/0015066 A1 | 1/2020 | Zhu |
| 2021/0120484 A1* | 4/2021 | Thorat ................ H04W 48/18 |
| 2021/0250890 A1* | 8/2021 | Won ..................... H04W 76/11 |

* cited by examiner

FIG. 1

| S-NSSAIs in Requested NSSAI from UE | Supporting S-NSSAIs in Network | S-NSSAIs in Allowed NSSAI |
|---|---|---|
| [AA], [BB], [CC] | [AA], [BA], [CA] | [AA] |

FIG. 2

| S-NSSAIs in Network | KPI values | Remark |
|---|---|---|
| AA | Upper limit: 100Mbps, 10msec | |
| BB | Upper limit: 10Mbps, 1msec | |
| CC | Upper limit: 50Mbps, 5msec | It can replace [CA] |
| BA | Upper limit: 20Mbps, 1msec | It can replace [BB] |
| CA | Upper limit: 50Mbps, 10msec | |

FIG. 3

| S-NSSAIs in Requested NSSAI from UE | Supporting S-NSSAIs in Network | S-NSSAIs in Allowed NSSAI |
|---|---|---|
| [AA], [BB], [CC] | [AA], [BA], [CA] | [AA], [BB/BA] |

FIG. 4

| S-NSSAIs in Network | KPI values | Load | Remark |
|---|---|---|---|
| AA | Upper limit: 100Mbps, 10msec | High | |
| BB | Upper limit: 10Mbps, 1msec | High | |
| CC | Upper limit: 50Mbps, 5msec | High | |
| BA | Upper limit: 50Mbps, 1msec | High | It can replace [BB], [CC] |
| CA | Upper limit: 100Mbps, 1msec | Low | It can replace [AA], [BB], [CC] |

FIG. 5

| S-NSSAIs in Requested NSSAI from UE | Supporting S-NSSAIs in Network | S-NSSAIs in Allowed NSSAI |
|---|---|---|
| [AA], [BB], [CC] | [AA], [BA], [CA] | [AA/CA], [BB/CA], [CC/CA] |

FIG. 6

| S-NSSAIs in Network | KPI values | Load | Remark |
|---|---|---|---|
| AA | Upper limit: 100Mbps, 10msec | High | |
| BB | Upper limit: 10Mbps, 1msec | High | |
| CC | Upper limit: 50Mbps, 5msec | High | |
| BA | Upper limit: 50Mbps, 1msec | Medium | It can replace [BB], [CC] |
| CA | Upper limit: 100Mbps, 1msec | Medium | It can replace [AA], [BB], [CC] |

FIG. 7

| S-NSSAIs in Requested NSSAI from UE | Supporting S-NSSAIs in Network | S-NSSAIs in Allowed NSSAI |
|---|---|---|
| [AA], [BB], [CC] | [AA], [BA], [CA] | [AA/CA], [BB/BA], [CC/BA] |

METHOD AND SYSTEM FOR NETWORK SLICE INTERWORKING OF 5G NETWORK

CROSS-REFERENCE TO RELATED APPLICATION(S)

This application claims the benefit of Korean Patent Application No. 10-2020-0122318 filed on Sep. 22, 2020, in the Korean Intellectual Property Office, the disclosure of which is incorporated herein by reference.

BACKGROUND

1. Field of the Invention

One or more example embodiments relate to a network slice interworking system and method, and more particularly, to a method of providing a mobile communications service without an error even when a terminal moves by providing interworking of network slices in 5G network of carrier.

2. Description of the Related Art

Network slicing refers to a technology for generating multiple logical networks configured to have specific network functions in a single physical network, rather than constructing multiple physical networks for individual services, in order to satisfy different performance requirements. Thus, the technology may facilitate the provision of various services having different characteristics and reduce the cost of network construction.

However, mobile communications operators may define their unique network slices that are different from one another. That is, the same single-network slice selection assistance information (S-NSSAI) value may indicate different network slices depending on each carrier.

Thus, when a terminal (e.g., a user equipment) that uses the same S-NSSAI value in a 5G network moves to an area of a different communications operator, the terminal may access a completely different slice intended, increasing the probability of the occurrence of an error.

Accordingly, there is a desire for a method of providing a mobile communications service without the occurrence of an error even when a terminal moves in a 5G network in which slices are defined differently by mobile communications operators.

SUMMARY

An aspect provides a network slice interworking system and method that may provide a mobile communications service without an error by providing a UE (user equipment) with information of a network slice that may be provided in current area information and mapping information with a subscribed network slice.

Another aspect also provides a network slice interworking system and method that may enable a mobile communications operator to apply a network slice with a unique characteristic that suits a characteristic of an area and ensure the performance of the selected slice.

According to an aspect, there is provided a network slice interworking method including receiving a registration request message from a user equipment (UE), verifying whether the registration request message matches pre-stored network slice subscription information, verifying whether network slice selection assistance information (NSSAI) included in the registration request message matches NSSAI provided in a registration area of the UE when the registration request message matches the network slice subscription information, allocating the NSSAI to the UE when the NSSAI included in the registration request message matches the NSSAI provided in the registration area of the UE, and transmitting a registration acceptance message including the NSSAI to the UE.

When the registration request message does not match the network slice subscription information, the method may further include determining the NSSAI included in the registration request message to be rejected NSSAI, and transmitting a registration rejection message including the rejected NSSAI to the UE.

The method may further include detecting for NSSAI available to interwork with the UE when the NSSAI included in the registration request message does not match the NSSAI provided in the registration area of the UE, allocating, to the UE, mapped NSSAI corresponding to allowed NSSAI when the NSSAI available to interwork with the UE is detected, and transmitting a registration acceptance message including the mapped NSSAI to the UE.

The detecting for the NSSAI may include searching for NSSAI with a key performance indicator (KPI) range that is larger than a requested network slice KPI range by referring to a relationship between NSSAI and a corresponding KPI.

When a plurality of pieces of the NSSAI with the KPI range that is larger than the requested network slice KPI range is retrieved, the detecting for the NSSAI may include searching for NSSAI with a lowest load among the retrieved pieces of the NSSAI.

When the NSSAI available to interwork with the UE is not detected, the detecting for the NSSAI may further include determining the NSSAI included in the registration request message to be rejected NSSAI, and transmitting a registration rejection message including the rejected NSSAI to the UE.

According to another aspect, there is provided an access and mobility management function (AMF) including a communicator configured to receive a registration request message from a UE, and a processor. The processor may verify whether the registration request message matches pre-stored network slice subscription information, verify whether NSSAI included in the registration request message matches NSSAI provided in a registration area of the UE when the registration request message matches the network slice subscription information, and allocate the NSSAI to the UE when the NSSAI included in the registration request message matches the NSSAI provided in the registration area of the UE. The communicator may transmit a registration acceptance message including the NSSAI to the UE.

When the registration request message does not match the network slice subscription information, the processor of the AMF may determine the NSSAI included in the registration request message to be rejected NSSAI. The communicator may transmit a registration rejection message including the rejected NSSAI to the UE.

The processor of the AMF may detect for NSSAI available to interwork with the UE when the NSSAI included in the registration request message does not match the NSSAI provided in the registration area of the UE, and allocate mapped NSSAI corresponding to allowed NSSAI to the UE when the NSSAI available to interwork with the UE is detected. The communicator may transmit a registration acceptance message including the mapped NSSAI to the UE.

The processor of the AMF may search for NSSAI with a KPI range that is larger than the requested network slice KPI range by referring to the relationship between NSSAI and a corresponding KPI.

When a plurality of pieces of the NSSAI with the KPI range that is larger than the requested network slice KPI range is retrieved, the processor of the AMF may search for NSSAI with a lowest load among the retrieved pieces of the NSSAI.

When the NSSAI available to interwork with the UE is not detected, the processor of the AMF may determine the NSSAI included in the registration request message to be rejected NSSAI. The communicator may transmit a registration rejection message including the rejected NSSAI to the UE.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some examples will be described in detail with reference to the accompanying drawings. However, various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Hereinafter, example embodiments will be described in detail with reference to the accompanying drawings.

Figure 1:
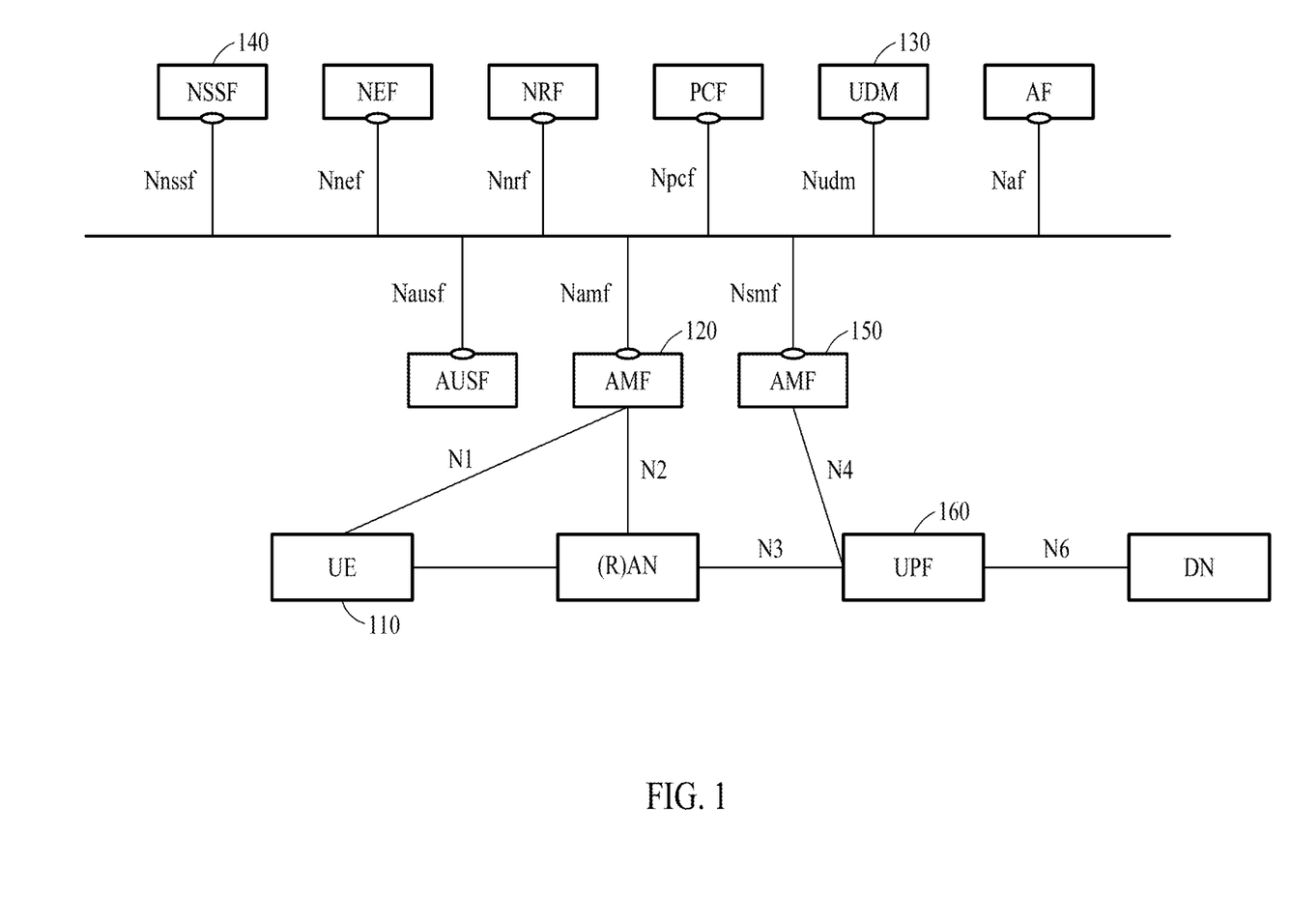
FIG. 1 is a diagram illustrating an example of a 5G network according to an example embodiment.

FIG. 1 is a diagram illustrating an example of a fifth-generation (5G) network to which a network slice interworking system described herein is applied according to an example embodiment. The 5G network may refer to a system that is designed with each logical function unit for virtualization and functionally divided into a control plane (CP) and a user plane (UP), and designs an architecture based on a principle of minimizing dependency between an access network (AN) and a core network (CN).

As illustrated in FIG. 1, the network slice interworking system may include a unit equipment (UE) 110, an access and mobility management function (AMF) 120, a unified data management (UDM) 130, a network slice selection function (NSSF) 140, a session management function (SMF) 150, and a user plane function (UPF) 160.

A data network (DN) may refer to a network to which the UE 110 has access, and a radio access network (RAN) may be a wireless or wired access network.

A protocol data unit (PDU) may refer to data exchanged between the UE 110 and the DN. A PDU connectivity service may refer to a service providing a PDU exchange. A PDU session may indicate an association between the UE 110 and the DN that provides the PDU connectivity service.

A PDU session may have an association between one piece of single-network slice selection assistance information (S-NSSAI) and one data network name (DNN), in which the S-NSSAI may indicate a network slice, and the DNN may indicate a name of a DN.

Thus, the UE 110 may set the number of PDU sessions corresponding to the number of S-NSSAI and the number of DNNs.

S-NSSAI may be used as a value that indicates a network slice. For example, the S-NSSAI may be a value of 32 bits that includes a slice/service type (SST) of 8 bits and a slice differentiator (SD) of 24 bits. The SST is defined by four standard values (eMBB=1, URLLC=2, MIoT=3. V2X=4) by the 3rd Generation Partnership Project (3GPP). The standard SST values may range from 0 to 127, and non-standard SST values may range from 128 to 255.

The non-standard SST values may be used based on a policy in a network managed by a communications operator and have a valid significance. An SST value may be determined through a negotiation with another operator for interworking (e.g., roaming).

The SD may have no standard value and be allocated based solely on a policy of a communications operator. Thus, the S-NSSAI may be classified into standard S-NSSAI that has only a standard SST value without an SD value, and non-standard S-NSSAI that has a standard SST value with an SD value or non-standard S-NSSAI that has a non-standard SST value without an SD value. While the standard S-NSSAI may be used by all communications operators, the non-standard S-NSSAI may be used as a valid method to indicate a network slice for a communications operator that defines the corresponding S-NSSAI or for another communications operator negotiating in advance with the communications operator.

Network slice selection assistance information (NSSAI) may be a set of one or more pieces of S-NSSAI and be variously defined according to the purpose of use.

Configured NSSAI may be network slice information provided to the UE 110 by a network (e.g., an AMF, etc.) by a unit of a network of a communications operator (e.g., a public land mobile network (PLMN)).

Subscribed S-NSSAI may be subscriber information that is used by the UE 110 in the PLMN, in which S-NSSAI may be indicated as an S-NSSAI value that is used in a home PLMN. Pieces of S-NSSAI (hereinafter simply "S-NS-SAIs") in the configured NSSAI provided to the UE 110 by the home PLMN may be matched with subscribed S-NS-SAIs which is the subscriber information of the UE 110.

The UE 110 may associate one application with one or more S-NSSAI(s). The S-NSSAI(s) associated with the application may be determined by a network slice selection policy (NSSP) of a UE route selection policy (URSP). The S-NSSAI may be indicated as an S-NSSAI value used in the home PLMN.

Allowed NSSAI may be information provided after a serving PLMN selects S-NSSAI based on an access type of the UE 110 from among S-NSSAIs that may be used in a current registration area (RA). The access type of the UE 110 may be an access type for which a request message is transmitted to the UE 110 in a UE registration process. Thus, S-NSSAI in the allowed NSSAI may be valid only in a particular area, not in the entire PLMN.

Requested NSSAI may be S-NSSAIs provided by the UE 110 to the serving PLMN in the UE registration process. For example, the requested NSSAI may include a maximum of eight S-NSSAIs, and the allowed NSSAI may also include a maximum of eight S-NSSAIs.

Rejected NSSAI may be S-NSSAIs of which utilization is not allowed by a network among the S-NSSAIs in the requested NSSAI in the UE registration process. That is, the allowed NSSAI, the requested NSSAI, and the rejected NSSAI may have a relationship, for example, (S-NSSAIs in rejected NSSAI)=(S-NSSAIs in requested NSSAI)–(S-NS-SAIs in allowed NSSAI). For example, in a case in which the number of the S-NSSAIs in the requested NSSAI is eight and the number of the S-NSSAIs in the allowed NSSAI is six, the number of the S-NSSAIs in the rejected NSSAI becomes two.

In addition, the UE 110 may store network slice-related information, for example, the configured NSSAI and the NSSP. The network slice-related information stored in the UE 110 may be defined as UE configuration information. The network slice-related information may also include at least one of S-NSSAI that defines a single slice, NSSAI which is a set of S-NSSAIs, S-NSSAI associated with each application installed in the UE 110, priority information associated with a priority between S-NSSAIs, S-NSSAIs in configured NSSAI, or S-NSSAIs in NSSP.

The S-NSSAIs in the NSSP stored in the UE 110 may be basically the same information as the subscribed S-NSSAIs stored in a network. The S-NSSAIs in the configured NSSAI stored in the UE 110 may be the same as the subscribed S-NSSAIs or have a value corresponding to the subscribed S-NSSAIs. For example, the S-NSSAIs in the configured NSSAI may have basically the same value as that of the subscribed S-NSSAIs. However, when the S-NSSAIs in the configured NSSAI and the subscribed S-NSSAIs correspond to each other one-to-one according to predetermined regulations and/or agreements, the S-NSSAIs in the configured NSSAI and the subscribed S-NSSAIs may have different values.

The PLMN may transmit the configured NSSAI to the UE 110 at any time. The UE 110 may store the configured NSSAI for each PLMN. The configured NSSAI may include a maximum of eight S-NSSAIs for each access type. The access type may be classified into two types—3GPP access and non-3GPP access.

When the UE 110 performs a registration process of the 5G network, the UE 110 may transmit a registration request message to the AMF 120.

The registration request message may include at least one of the S-NSSAI(s) in the allowed NSSAI and in the configured NSSAI, in the requested NSSAI. The UE 110 may also add, to the registration request message, S-NSSAIs that are not the same as the S-NSSAIs in the allowed NSSAI among the S-NSSAIs in the configured NSSAI.

The AMF 120 may manage registration, connection (or access), and mobility such that the UE 110 receives a service from a network. The AMF 120 may include a communicator and a processor.

The AMF 120 may receive the registration request message from the UE 110. The processor of the AMF 120 may verify the requested NSSAI received from the UE 110 and allocate useable S-NSSAIs as allowed NSSAI. The processor of the AMF 120 may then transmit a registration acceptance message including the allowed NSSAI to the UE 110. The UE 110 may use a network slice corresponding to S-NSSAI included in the allowed NSSAI. Here, the allowed NSSAI may include a maximum of eight S-NSSAIs.

In detail, the processor of the AMF 120 may verify whether the registration request message matches pre-stored network slice subscription information (or the subscribed S-NSSAIs).

When the registration request message does not match the network slice subscription information (subscribed S-NS-SAIs), the processor of the AMF 120 may determine the S-NSSAIs in the requested NSSAI that are included in the registration request message to be S-NSSAIs in rejected NSSAI. The communicator of the AMF 120 may then transmit a registration rejection message including the S-NSSAIs in the rejected NSSAI to the UE 110.

When the registration request message matches the network slice subscription information (subscribed S-NSSAIs), the processor of the AMF 120 may verify whether the S-NSSAIs in the requested NSSAI that are included in the registration request message match NSSAI provided in a registration area of the UE 110.

When the S-NSSAIs in the requested NSSAI included in the registration request message match the NSSAI provided in the registration area of the UE 110, the processor of the AMF 120 may allocate the NSSAI (the S-NSSAIs in the allowed NSSAI) to the UE 110. The communicator of the AMF 120 may transmit a registration acceptance message including the S-NSSAIs in the allowed NSSAI to the UE 110.

However, when the S-NSSAIs in the requested NSSAI included in the registration request message do not match the NSSAI provided in the registration area of the UE 110, the processor of the AMF 120 may detect for S-NSSAI available to interwork with the UE.

In such a case, the processor of the AMF 120 may search for S-NSSAI with a broader key performance indicator (KPI) range than a requested network slice KPI range by referring to a relationship between NSSAI and a corresponding KPI. When a plurality of pieces of S-NSSAI with the broader KPI range than the requested network slices KPI range is retrieved, the processor of the AMF 120 may search for NSSAI with a lowest load from among the retrieved S-NSSAIs. In addition, in a case in which the S-NSSAI available to interwork with the UE 110 is not detected, the processor of the AMF 120 may determine the S-NSSAIs in the requested NSSAI included in the registration request message to be rejected S-NSSAIs in rejected NSSAI. The communicator of the AMF 120 may transmit a registration rejection message including the rejected S-NSSAIs in the rejected NSSAI.

In contrast, in a case in which the S-NSSAI available to interwork with the UE 110 is detected, the processor of the AMF 120 may allocate mapped S-NSSAI in allowed NSSAI to the UE 110. The communicator of the AMF 120 may transmit a registration acceptance message including the mapped S-NSSAI in the allowed NSSAI to the UE 110.

An authentication server function (AUSF) may perform an authentication function. The network exposure function (NEF) may perform a function of exposing a network function. The network repository function (NRF) may perform a function of, for example, searching for a network function instance, managing a profile of a network function instance, and the like. The NSSF 140 may select a network slice instance and determine the AMF 120. The policy control function (PCF) may perform a function of providing, for example, an integrated policy framework, a policy rule, and the like. The SMF 150 may perform a function of, for example, managing a session, allocating an Internet protocol (IP) address, selecting and controlling a UPF, and the like. The UDM 130 may perform a function of, for example, processing user identification, managing subscription information, and the like. The UPF 160 may perform a function, for example, PDU session access to a DN, packet routing and forwarding, quality of service (QoS) processing, and the like. An application function (AF) may perform a function, for example, traffic routing adjustment, NEF access, and the like.

The AMF 120 and the NSSF 140 included in the 5G network may store and manage network slice-related information supporting network slice interworking function.

As described above, the network slice interworking function may provide the UE 110 with information of a network slice that may be provided in current area information and mapping information with a subscribed network slice, thereby providing a mobile communications service without an error. In addition, the network slice interworking function may allow a mobile communications operator to apply a network slice with unique characteristics that suit characteristics of an area and ensure the performance of a selected slice.

Figure 2:
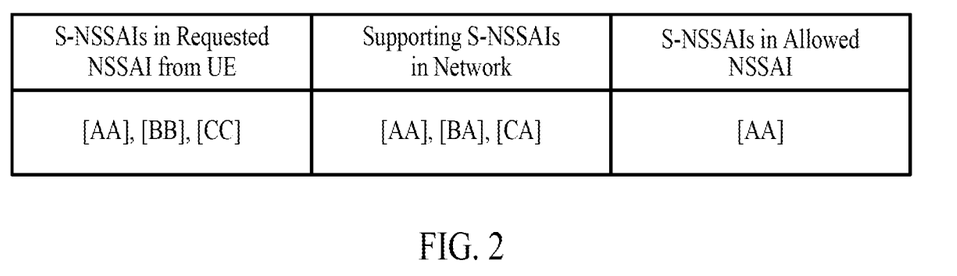
FIG. 2 is a diagram illustrating an example of an allocation of network slice selection assistance information (NS-SAI) according to an example embodiment.

FIG. 2 is a diagram illustrating an example of an allocation of NSSAI according to an example embodiment.

In FIG. 2, illustrated is an association among S-NSSAIs in requested NSSAI that are received from the UE 110, NSSAI supported by a network (or simply "supporting S-NSSAIs"), and S-NSSAIs in allowed NSSAI that indicate network slices available to the UE 110.

The AMF 120 of a network may compare the S-NSSAIs in the requested NSSAI from the UE 110 and the supporting S-NSSAIs and allocate only a network slice having the same value to the UE 110. For example, as illustrated in FIG. 2, although the UE 110 may request network slices [AA], [BB], and [CC] (as in the S-NSSAIs in the requested NSSAI), the network may support only network slices [AA], [BA], and [CA] (as in the supporting S-NSSAIs). In such a case, the AMF 120 of the network may allocate the network slice [AA] to the UE 110 (as in the S-NSSAIs in the allowed NSSAI), and the network slices [BB] and [CC] may not be used.

Figure 3:
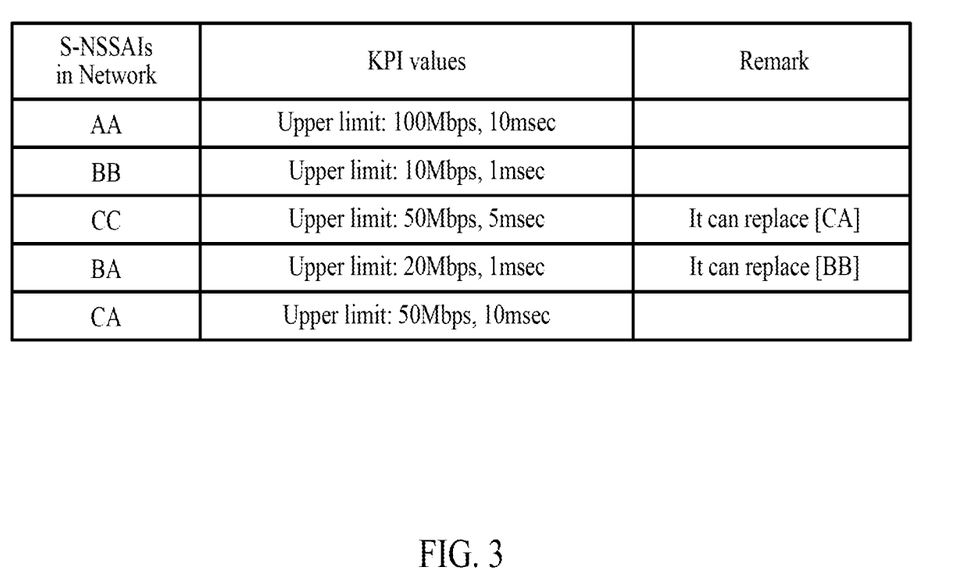
FIG. 3 is a diagram illustrating an example of a definition of an association between NSSAI and a corresponding key performance indicator (KPI) according to an example embodiment.

FIG. 3 is a diagram illustrating an example of a definition of an association between NSSAI and a corresponding KPI according to an example embodiment.

In FIG. 3, illustrated is a relationship between NSSAI stored in a network and a corresponding KPI. The KPI of NSSAI (or S-NSSAIs) may be known in advance to the AMF 120, the UDM 130, and the NSSF 140 of the network. The network may provide network slice interworking as described hereinafter with reference to FIG. 3.

When a network slice requested by the UE 110 is not supported in a registration area of the UE 110, the AMF 120, the UDM 130, and the NSSF 140 of the network may identify network slices that interwork with the network slice requested by the UE 110. The AMF 120, the UDM 130 and the NSSF 140 of the network may compare each KPI range of the identified network slices to a KPI range of the network slices requested by the UE 110.

The AMF 120, the UDM 130 and the NSSF 140 of the network may replace the network slice requested by the UE 110 with a network slice with a KPI range larger than the KPI range of the network slice requested by the UE 110 among the identified network slices.

For example, the UE 110 may request a registration of a network slice [BB] (upper limit: 10 megabits per second (Mbps), 1 millisecond (msec)), but the network may not support the network slice [BB] in the registration area of the UE 110. In such a case, the AMF 120, the UDM 130, and the NSSF 140 of the network may replace the network slice [BB] with the network slice [BA] (upper limit: 100 Mbps, 5 msec) that includes the KPI range of the network slice [BB].

Figure 4:
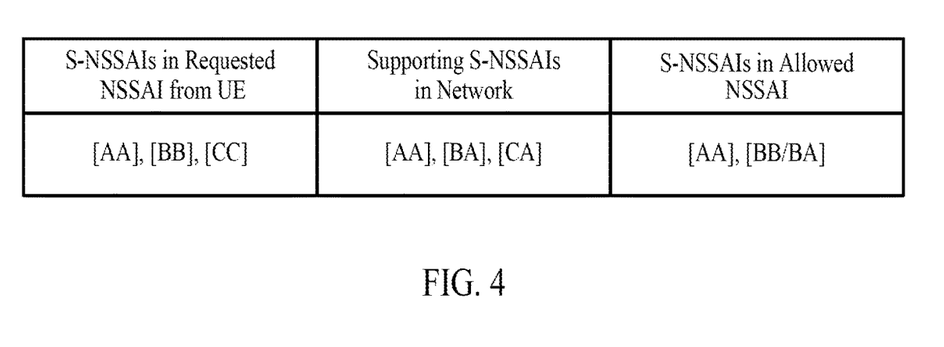
FIG. 4 is a diagram illustrating an example of an expanded allocation of NSSAI according to an example embodiment.

FIG. 4 is a diagram illustrating an example of an expanded allocation of NSSAI according to an example embodiment in case of FIG. 3.

In FIG. 4, illustrated is an association among S-NSSAIs in requested NSSAI received from the UE 110, NSSAI supported by a network (or simply "supporting S-NSSAIs"), and S-NSSAIs in allowed NSSAI that indicates network slices available to the UE 110.

For example, as illustrated, the UE 110 may request network slices [AA], [BB], and [CC] (as in the S-NSSAIs in the requested NSSAI), but the network may support network slices [AA], [BA], and [CA] (as in the supporting S-NS-SAIs). The AMF 120, the UDM 130, and the NSSF 140 of the network may allocate network slices [AA] and [BB/BA] (as in the S-NSSAIs in the allowed NSSAI), and the network slice [CC] may not be used.

The AMF 120, the UDM 130, and the NSSF 140 of the network may compare a KPI of a network slice requested by the UE 110 to a KPI of the S-NSSAIs supported by the network. The AMF 120, the UDM 130, and the NSSF 140 of the network may allocate, to the UE 110, a network slice having a KPI range that is equal to or greater than a KPI range of the network slice requested by the UE 110 among the supporting S-NSSAIs of the network.

In this example, the network slice [BB/BA] allocated by the AMF 120, the UDM 130, and the NSSF 140 of the network to the UE 110 (as in the S-NSSAIs in the allowed NSSAI) may indicate that the network slice [BB] requested by the UE 110 is mapped to, or interworks with, the network slice [BA].

Figure 5:
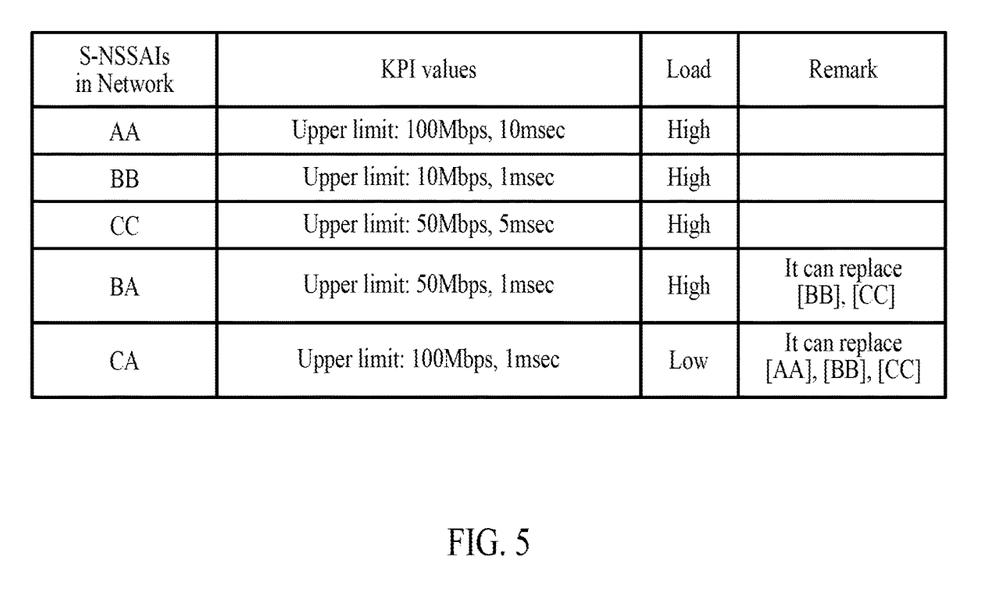
FIG. 5 is a diagram illustrating an example of a utilization-based definition of an association between NSSAI and a corresponding KPI according to an example embodiment.

FIG. 5 is a diagram illustrating an example of a utilization-based definition of an association between NSSAI and a corresponding KPI according to an example embodiment.

In FIG. 5, illustrated is a relationship between S-NSSAIs stored in a network and a corresponding KPI.

A KPI of the S-NSSAIs may be known in advance to the AMF 120, the UDM 130, and the NSSF 140 of the network. The network may provide network slice interworking as described hereinafter with reference to FIG. 5.

When a network slice requested by the UE 110 in a registration area of the UE 110 is not supported, the AMF 120, the UDM 130, and the NSSF 140 of the network may identify network slices that interwork with the network slice requested by the UE 110.

The AMF 120, the UDM 130, and the NSSF 140 of the network may then compare a KPI range of each of the identified network slices to the KPI range of the network slice requested by the UE 110.

When a plurality of network slices with a KPI range that is larger than the KPI range of the network slice requested by the UE 110 is present among the identified network slices, the AMF 120, the UDM 130, and the NSSF 140 of the network may determine a network slice that is to replace the network slice requested by the UE 110 based on a current load state of each of the network slices with the KPI range that is larger than the KPI range of the network slice requested by the UE 110.

For example, as illustrated, the UE 110 may request a registration of a network slice [BB] (upper limit: 10 Mbps, 1 msec), but the network may not support the network slice [BB] in the registration area of the UE 110. In such a case, the AMF 120, the UDM 130, and the NSSF 140 of the network may search for a network slice [BA] and a network slice [CA] that include a KPI range of the network slice [BB].

The network slice [BA] may have a high load and the network slice [CA] may have a low load, and thus the AMF 120, the UDM 130, and the NSSF 140 of the network may select the network slice [CA] with the low load. The AMF 120, the UDM 130, and the NSSF 140 of the network may replace the network slice [BB] with the network slice [CA].

Figure 6:
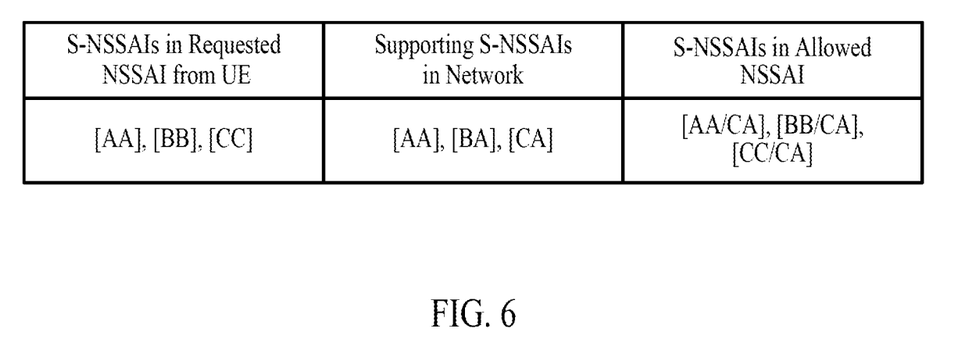
FIG. 6 is a diagram illustrating an example of a utilization-based expanded allocation of NSSAI according to an example embodiment.

FIG. 6 is a diagram illustrating an example of a utilization-based expanded allocation of NSSAI according to an example embodiment in case of FIG. 5.

In FIG. 6, illustrated is an association among S-NSSAIs in requested NSSAI received from the UE 110, NSSAI supported by a network (or simply "supporting S-NSSAIs"), and S-NSSAIs in allowed NSSAI that indicates network slices available to the UE 110.

For example, as illustrated, when the UE 110 requests network slices [AA], [BB], and [CC] (as in the S-NSSAIs in the requested NSSAI), but the network supports network slices [AA], [BA], and [CA] (as in the supporting S-NSSAIs), the AMF 120, the UDM 130, and the NSSF 140 of the network may allocate network slices [AA/CA], [BB/CA], and [CC/CA] (as in the S-NSSAIs in the allowed NSSAI).

In detail, the AMF 120, the UDM 130, and the NSSF 140 of the network may compare a KPI of a network slice requested by the UE 110 and a KPI of the supporting S-NSSAIs. The AMF 120, the UDM 130, and the NSSF 140 of the network may allocate a network slice having a KPI that is equal to or larger than the KPI of the network slice requested by the UE 110. In this case, the AMF 120, the UDM 130 and the NSSF 140 of the network may allocate the network slice [CA] instead of [BA] based on a current load status of each of the network slices. The network slice [AA/CA] allocated by the network (as in the S-NSSAIs in the allowed NSSAI) may indicate that the requested network slice [AA] is mapped to or interworks with the network slice [CA].

Figure 7:
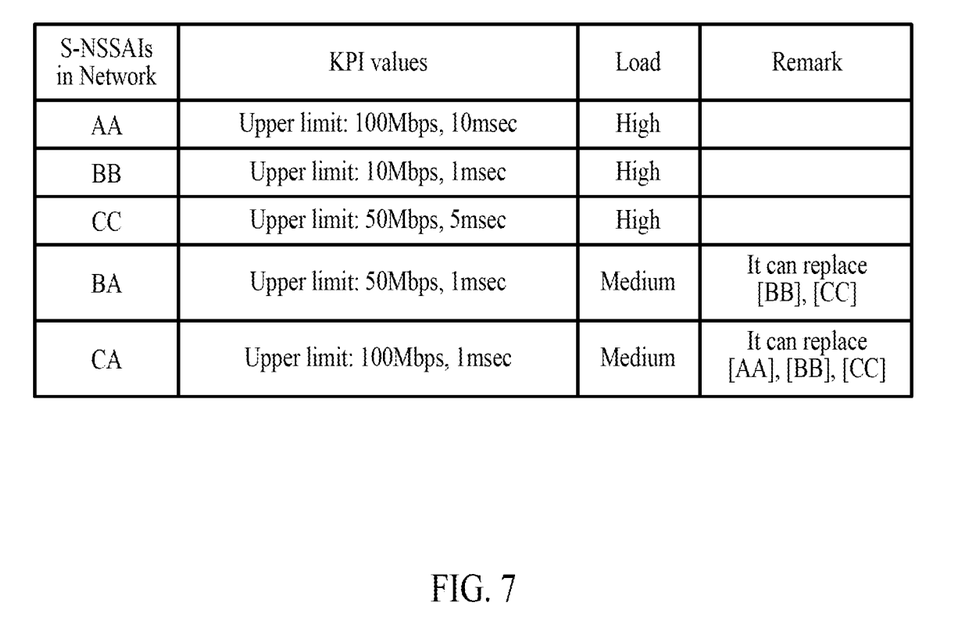
FIG. 7 is a diagram illustrating an example of a load balancing-based definition of an association between NSSAI and a corresponding KPI according to an example embodiment.

FIG. 7 is a diagram illustrating an example of a load balancing-based definition of an association between NSSAI and a corresponding KPI according to an example embodiment.

In FIG. 7, illustrated is a relationship between S-NSSAIs stored in a network and a corresponding KPI.

A KPI of the S-NSSAIs may be known in advance to the AMF 120, the UDM 130, and the NSSF 140 of the network. The network may provide network slice interworking as described hereinafter with reference to FIG. 7.

For example, as illustrated, the UE 110 may request a registration of a network slice [BB] (upper limit: 10 Mbps, 1 msec), but the network may not support the network slice [BB] in the registration area of the UE 110. In such a case, the AMF 120, the UDM 130, and the NSSF 140 of the network may find a network slice [BA] and a network slice [CA] that include a KPI range of the network slice [BB].

The AMF 120, the UDM 130, and the NSSF 140 of the network may then replace the network slice [BB] with the network slice [BA] or the network slice [CA] based on a current load status of each of the network slices.

Figure 8:
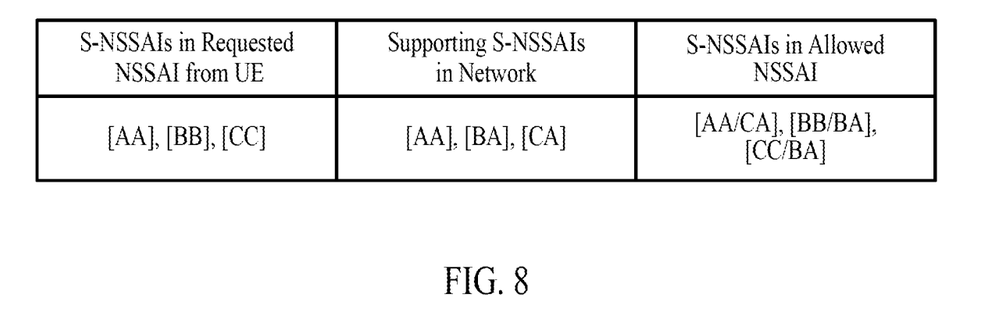
FIG. 8 is a diagram illustrating an example of a load balancing-based expanded allocation of NSSAI according to an example embodiment.

FIG. 8 is a diagram illustrating an example of a load balancing-based expanded allocation of NSSAI according to an example embodiment in case of FIG. 7.

In FIG. 8, illustrated is an association between S-NSSAIs in requested NSSAI received from the UE 110, NSSAI supported by a network (or simply "supporting S-NSSAIs"), and S-NSSAIs in allowed NSSAI that indicate network slices available to the UE 110.

For example, the UE 110 may request network slices [AA], [BB], and [CC] (as in the S-NSSAIs in the requested NSSAI), but the network may support only [AA], [BA], and [CA] (as in the supporting S-NSSAIs). The AMF 120, the UDM 130, and the NSSF 140 of the network may allocate, to the UE 110, network slices [AA/CA], [BB/BA], and [CC/BA] (as in the S-NSSAIs in the allowed NSSAI).

In detail, the AMF 120, the UDM 130, and the NSSF 140 of the network may compare a KPI of a network slice requested by the UE 110 to a KPI of the supporting S-NSSAIs. The AMF 120, the UDM 130, and the NSSF 140 of the network may allocate a network slice having a KPI range that is equal to or larger than the KPI range of the network slice requested by the UE 110 among the supporting S-NSSAIs.

In this case, the AMF 120, the UDM 130, and the NSSF 140 of the network may selectively allocate the network slice [BA] or [CA] based on a current load status of each of the network slices to achieve a load balancing effect. The network slice [AA/CA] allocated by the network (as in the S-NSSAIs in the allowed NSSAI) may indicate that the network slice [AA] requested by the UE 110 is mapped to or interworks with the network slice [CA].

Figure 9:
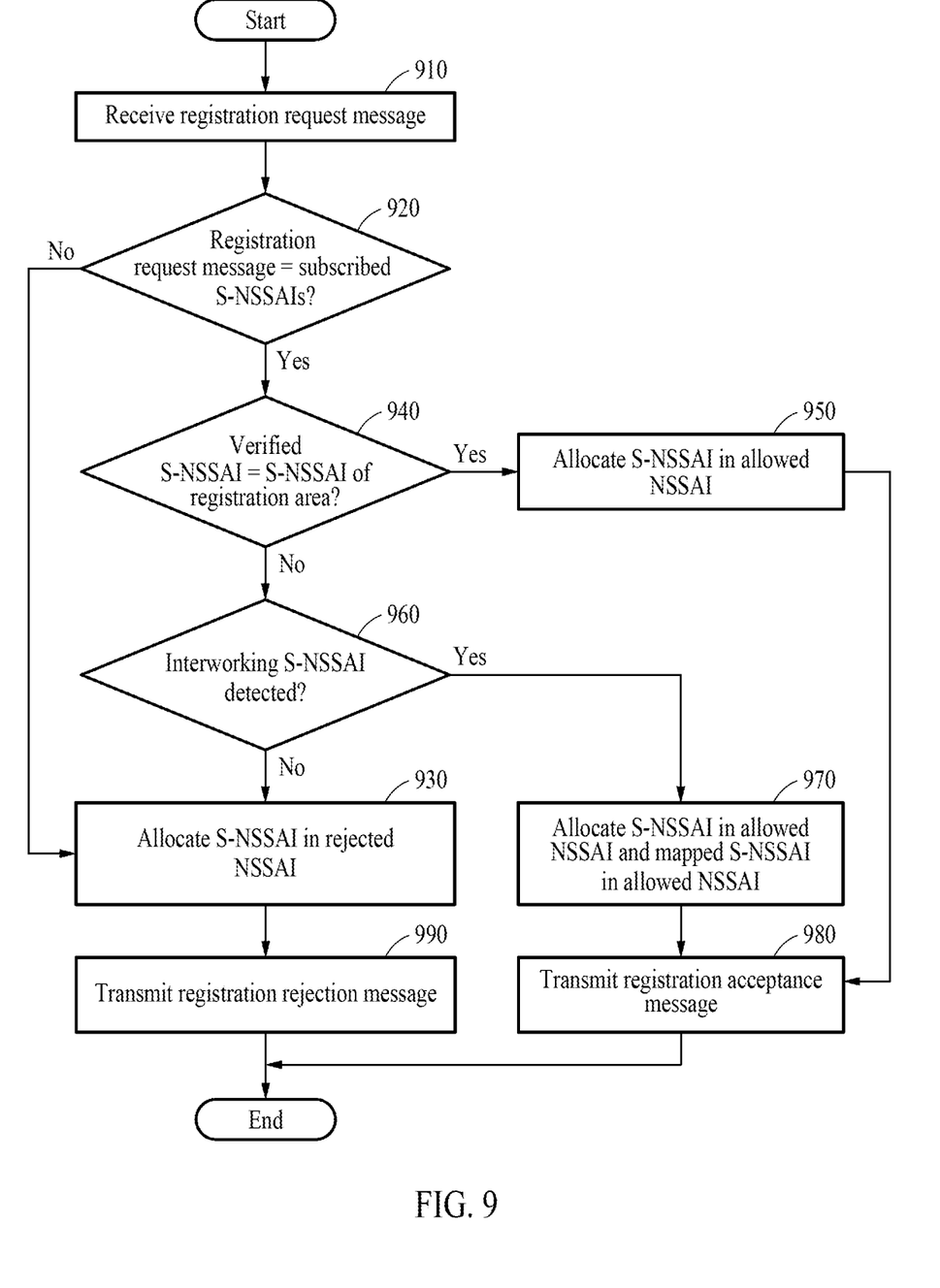
FIG. 9 is a flowchart illustrating an example of a network slice interworking method according to an example embodiment.

FIG. 9 is a flowchart illustrating an example of a network slice interworking method according to an example embodiment.

In operation 910, the AMF 120 may receive a registration request message from the UE 110. The registration request message may include NSSAI (S-NSSAIs in requested NSSAI).

In operation 920, the AMF 120 may verify whether the registration request message matches pre-stored network slice subscription information (subscribed S-NSSAIs). The AMF 120 may also verify an access type.

When the registration request message does not match the network slice subscription information, the AMF 120 may perform operation 930. When the registration request message matches the network slice subscription information, the AMF 120 may perform operation 940.

In operation 930, the AMF 120 may determine NSSAI included in the registration request message (S-NSSAIs in requested NSSAI) to be rejected NSSAI (S-NSSAIs in rejected NSSAI).

In operation 940, the AMF 120 may verify whether the NSSAI included in the registration request message (S-NSSAIs in requested NSSAI) matches NSSAI provided in a registration area of the UE 110.

When the NSSAI included in the registration request message (S-NSSAIs in requested NSSAI) matches the NSSAI provided in the registration area of the UE 110, the AMF 120 may perform operation 950. When the NSSAI included in the registration request message (S-NSSAIs in requested NSSAI) does not match the NSSAI provided in the registration area of the UE 110, the AMF 120 may perform operation 960.

In operation 950, the AMF 120 may allocate the NSSAI (S-NSSAI in allowed NSSAI) to the UE 110.

In operation 960, the AMF 120 may detect for NSSAI (S-NSSAI) that interworks with the UE 110. The AMF 120 may search for NSSAI (S-NSSAI) associated with a network slice with a KPI range that is greater than a KPI range of a requested network slice by referring to a relationship between NSSAI and a corresponding KPI.

When the NSSAI (S-NSSAI) that interworks with the UE 110 is not detected, the AMF 120 may perform operation 930. When the NSSAI (S-NSSAI) that interworks with the UE 110 is detected, the AMF 120 may perform operation 970.

In operation 970, the AMF 120 may allocate, to the UE 110, the NSSAI (S-NSSAI in allowed NSSAI), and mapped NSSAI corresponding to the allowed NSSAI (mapped S-NSSAI in allowed NSSAI).

In operation 980, the AMF 120 may transmit a registration acceptance message including the NSSAI (S-NSSAI in allowed NSSAI) to the UE 110.

In operation 990, the AMF 120 may transmit a registration rejection message including rejected NSSAI (S-NSSAI in rejected NSSAI) to the UE 110.

According to example embodiments, it is possible to provide a mobile communications service without an error by providing a UE with network slice information to be provided in current area information and mapping information with subscribed network slices.

It is also possible to provide a method that allows a mobile communications operator to apply a network slice with unique characteristics that suit characteristics of an area and ensure the performance of a selected slice.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A network slice interworking method, comprising:
receiving a registration request message from a user equipment (UE);
verifying whether the registration request message matches pre-stored network slice subscription information;
when the registration request message matches the network slice subscription information, verifying whether network slice selection assistance information (NSSAI) comprised in the registration request message matches NSSAI provided in a registration area of the UE;
when the NSSAI comprised in the registration request message matches the NSSAI provided in the registration area of the UE, allocating the NSSAI to the UE; and
transmitting a registration acceptance message comprising the NSSAI to the UE.

2. The method of claim 1, further comprising:
when the registration request message does not match the network slice subscription information, determining the NSSAI comprised in the registration request message to be rejected NSSAI; and
transmitting a registration rejection message comprising the rejected NSSAI to the UE.

3. The method of claim 1, further comprising:
when the NSSAI comprised in the registration request message does not match the NSSAI provided in the registration area of the UE, detecting for NSSAI available to interwork with the UE;
when the NSSAI available to interwork with the UE is detected, allocating, to the UE, mapped NSSAI corresponding to allowed NSSAI; and
transmitting a registration acceptance message comprising the mapped NSSAI to the UE.

4. The method of claim 3, wherein the detecting for the NSSAI comprises:
searching for NSSAI with a key performance indicator (KPI) range that is greater than a requested network slice KPI range by referring to a relationship between NSSAI and a corresponding KPI.

5. The method of claim 4, wherein the detecting for the NSSAI comprises:
when a plurality of pieces of the NSSAI with the KPI range that is greater than the requested network slice KPI range is retrieved, searching for NSSAI with a lowest load among the retrieved pieces of the NSSAI.

6. The method of claim 3, further comprising:
when the NSSAI available to interwork with the UE is not detected, determining the NSSAI comprised in the registration request message to be rejected NSSAI; and
transmitting a registration rejection message comprising the rejected NSSAI to the UE.

7. A non-transitory computer-readable storage medium storing instructions that, when executed by a processor, cause the processor to perform the method of claim 1.

8. An access and mobility management function (AMF), comprising:
a communicator configured to receive a registration request message from a user equipment (UE); and
a processor,
wherein the processor is configured to:
verify whether the registration request message matches pre-stored network slice subscription information;
when the registration request message matches the network slice subscription information, verify whether network slice selection assistance information (NSSAI) comprised in the registration request message matches NSSAI provided in a registration area of the UE; and
when the NSSAI comprised in the registration request message matches the NSSAI provided in the registration area of the UE, allocate the NSSAI to the UE, and
the communicator is configured to transmit a registration acceptance message comprising the NSSAI to the UE.

9. The AMF of claim 8, wherein the processor is configured to:
when the registration request message does not match the network slice subscription information, determine the NSSAI comprised in the registration request message to be rejected NSSAI, and
the communicator is configured to transmit a registration rejection message comprising the rejected NSSAI to the UE.

10. The AMF of claim 8, wherein the processor is configured to:
when the NSSAI comprised in the registration request message does not match the NSSAI provided in the registration area of the UE, detect for NSSAI available to interwork with the UE,
wherein, when the NSSAI available to interwork with the UE is detected, the processor is configured to allocate mapped NSSAI corresponding to allowed NSSAI to the UE, and
the communicator is configured to transmit a registration acceptance message comprising the mapped NSSAI to the UE.

11. The AMF of claim 10, wherein the processor is configured to:
search for NSSAI with a key performance indicator (KPI) range that is greater than a requested network slice KPI range by referring to a relationship between NSSAI and a corresponding KPI.

12. The AMF of claim 11, wherein the processor is configured to:
when a plurality of pieces of the NSSAI with the KPI range that is greater than the requested network slice KPI range is retrieved, search for NSSAI with a lowest load among the retrieved pieces of the NSSAI.

13. The AMF of claim 10, wherein the processor is configured to:
when the NSSAI available to interwork with the UE is not detected, determine the NSSAI comprised in the registration request message to be rejected NSSAI, and
the communicator is configured to transmit a registration rejection message comprising the rejected NSSAI to the UE.

* * * * *